(12) United States Patent
Share et al.

(10) Patent No.: US 7,479,326 B2
(45) Date of Patent: Jan. 20, 2009

(54) OXYGEN SCAVENGING POLYMERS

(75) Inventors: Paul E. Share, Wexford, PA (US); Keith R. Pillage, Pittsburgh, PA (US); Charles I. Skillman, Cranberry Township, PA (US); Paul E. Fuchs, Saxonburg, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 316 days.

(21) Appl. No.: 11/371,335

(22) Filed: Mar. 8, 2006

(65) Prior Publication Data

US 2006/0202161 A1 Sep. 14, 2006

Related U.S. Application Data

(60) Provisional application No. 60/659,617, filed on Mar. 8, 2005, provisional application No. 60/669,571, filed on Apr. 8, 2005.

(51) Int. Cl.
*C08G 63/52* (2006.01)

(52) U.S. Cl. .................. 428/480; 428/413; 428/423.7; 428/475.2; 528/73; 528/75; 528/303; 528/305; 528/365; 528/339; 252/188.28

(58) Field of Classification Search ............ 428/35.7, 428/34.2, 480, 413, 423.7, 475.2; 528/272, 528/271, 190, 339, 365, 305, 303, 75, 73; 525/445; 606/231, 133; 252/188.28; 524/599, 524/394
See application file for complete search history.

(56) References Cited

U.S. PATENT DOCUMENTS

| 4,388,926 | A | * | 6/1983 | Shalaby et al. ............ 606/231 |
| 5,211,875 | A | * | 5/1993 | Speer et al. ............ 252/188.28 |
| 5,399,289 | A | * | 3/1995 | Speer et al. ............ 252/188.28 |
| 5,646,236 | A | | 7/1997 | Schafheutle et al. |
| 6,083,585 | A | | 7/2000 | Cahill et al. |
| 6,509,417 | B1 | | 1/2003 | Wetzel et al. |
| 6,863,988 | B2 | | 3/2005 | Tibbitt et al. |
| 7,294,671 | B2 | | 11/2007 | Bheda et al. |
| 2003/0012896 | A1 | | 1/2003 | Ching et al. |
| 2003/0157283 | A1 | | 8/2003 | Tai et al. |
| 2005/0085577 | A1 | * | 4/2005 | Ching et al. ............ 524/394 |
| 2006/0054525 | A1 | * | 3/2006 | Dean et al. ............ 206/459.1 |

FOREIGN PATENT DOCUMENTS

| JP | 62 116623 | 5/1987 |
| WO | 02/36670 | 5/2002 |

OTHER PUBLICATIONS

Notification of Transmittal of the International Preliminary Report on Patentability for corresponding patent application No. PCT/US2006/008996, mailed May 22, 2007, 12 pages.

Amendment Under Article 34 and Response to Written Opinion for corresponding patent application No. PCT/US2006/008996, filed Jan. 3, 2007, 13 pages.

International Search Report and the Written Opinion, from corresponding PCT Application Serial No. PCT/US2006/008996, mailed Jun. 23, 2006, 16 pages.

* cited by examiner

*Primary Examiner*—James J. Seidleck
*Assistant Examiner*—Frances Tischler

(57) ABSTRACT

A polymer with a backbone having at least one structural unit represented by formula (I):

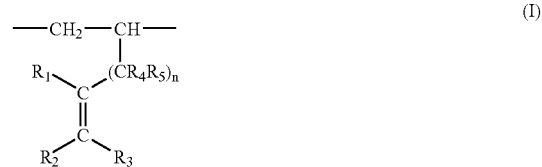

Wherein $R_1$, $R_2$, $R_3$, $R_4$, and $R_5$ independently denote one of a hydrogen atom, a substituted or unsubstituted alkyl group, a substituted or unsubstituted cycloalkyl group, or a substituted or unsubstituted alkenyl group, and n preferably denotes an integer from 1 to 10.

30 Claims, No Drawings

OXYGEN SCAVENGING POLYMERS

This application claims the benefit of U.S. Provisional Application Ser. No. 60/659,617, filed Mar. 8, 2005, and 60/669,571, filed Apr. 8, 2005, the entire contents of which are incorporated herein by reference.

TECHNICAL FIELD

This invention relates to an oxygen scavenging polymer. The polymer may be applied to a package, or made into packaging, wrapping and storage articles to preserve the freshness of, for example, foods and beverages.

BACKGROUND

Plastic materials can be used in a wide variety of packaging, wrapping, and storage articles. Plastic materials traditionally have not had good barrier properties to gases (particularly oxygen). Plastics have generally functioned poorly at excluding oxygen passage compared with other available materials, such as glass or metal.

However, despite this shortcoming, some plastic materials have become widely used for some packaging applications. For example, polyethylene terephthalate (PET) has become widely used for soft drink bottles, water bottles, and the like. However, the barrier properties of PET have limited its use for other applications in which the package contents are more susceptible to degradation from exposure to oxygen. For example, glass still predominates in juice and beer bottling.

To reduce gas transmission of a plastic packaging material, a passive barrier may be used to hinder the passage of a gas, e.g. oxygen. For example, in a multi-layer bottle, the inner and outer layers may be made of PET, while the center layer is a different material with passive barrier properties such as, for example, ethylene vinyl alcohol (EVA). However, layers of dissimilar materials often do not adhere well to one another, and an adhesive between the layers may be required to prevent delamination. The clarity of the packaging material may be reduced when a passive barrier material is used, and the multi-layered material may be more difficult to recycle.

An active oxygen scavenging system, which reduces or depletes the oxygen in an environment, may be used to overcome at least some of the limitations of a passive barrier system. An active oxygen scavenger, such as a polyamide or a polyolefin, may be incorporated into the backbone of a base polymer material making up the walls of the package to form an oxygen scavenging polymer. The oxygen scavenging polymer may be used in a blend with other polymers, or as an oxygen absorbing layer in a multi-layer container.

However, since the oxidation occurs in the backbone of the polymer, the properties of the oxygen scavenging polymer may change compared to the unmodified base polymer. As a result of the oxidation, the polymer may even begin to degrade over time. Polyamide systems often yellow due to oxidation, and this oxidation may occur during injection molding of the original articles, during storage, use, or during recycling.

SUMMARY

In formulating an oxygen absorbing polymer, the challenge for the package designer is to balance barrier properties, clarity, recyclability, and cost, while preserving as many of the beneficial properties of the unmodified base polymer as possible.

In one aspect, the invention is an oxygen scavenging polymer including a base polymer suitable for use in packaging applications, such as for example, a polyester, a polyurethane, a polyepoxide, or a polyamide, which has attached to its backbone an unsaturated side chain with one or more carbon-carbon double bonds. The one or more carbon-carbon double bonds in the side chain do not involve the first carbon atom of the side chain, which as defined herein is the carbon atom located adjacent to the polymer backbone.

In one embodiment, the invention is an oxygen scavenging polymer with a backbone having at least one structural unit represented by formula (I):

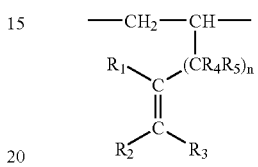

Wherein $R_1$, $R_2$, $R_3$, $R_4$, and $R_5$ independently denote one of a hydrogen atom, a substituted or unsubstituted alkyl group, a substituted or unsubstituted cycloalkyl group, or a substituted or unsubstituted alkenyl group;

$R_1$, $R_2$, $R_3$, $R_4$, and $R_5$ preferably each have less than 20 carbon atoms; and n preferably denotes an integer from 1 to 10.

In another aspect, the invention is an oxygen scavenging polymer composition including the oxygen scavenging polymer and an oxidation catalyst.

In yet another aspect, the invention is a solution or a dispersion including the oxygen scavenging polymer and/or composition and a suitable solvent. The solution or dispersion may be applied, for example, as a coating for packaging articles.

In yet another aspect, the invention is a packaging material including the oxygen scavenging polymer and/or composition. The packaging material may include the oxygen scavenging polymer and/or composition as a blend with other polymers in a single layer package such as a bottle or a film. Or, the oxygen scavenging polymer and/or composition may be used alone or as a blend with other polymers in one or more layers in a multi-layered package such as a bottle or a film.

In yet another aspect, the invention is a method for making the oxygen scavenging polymer including reacting one of a polymer precursor or a polymer with a succinic anhydride derivative and a polymerization catalyst. A suitable succinic anhydride derivative includes the reaction product of maleic anhydride and a substituted alkene. Preferred substituents for the substituted alkene include saturated or unsaturated hydrocarbon chains, which may be substituted or unsubstituted, and substituted or unsubstituted phenyl groups.

The details of one or more embodiments of the invention are set forth in the accompanying drawings and the description below. Other features, objects, and advantages of the invention will be apparent from the description, and from the claims.

DETAILED DESCRIPTION

In one aspect, the invention is an oxygen scavenging polymer. As used herein, the term "oxygen scavenging" means absorbing, consuming, or reducing the amount of oxygen from a given environment. The oxygen scavenging polymer includes a base polymer suitable for packaging applications that is modified with an unsaturated side chain attached to its backbone. Preferably, the unsaturated side chain has one or more carbon-carbon double bonds, and the side chain enhances the oxygen scavenging capacity of the polymer compared to its unmodified base form. The one or more carbon-carbon double bonds in the side chain preferably do not involve the first carbon atom of the side chain located adjacent to the polymer backbone. Preferably, the one or more carbon-carbon double bonds present in the side chain include a single carbon-carbon double bond, and, assuming the carbon atom adjacent to the backbone is referred to as carbon 1 of the side chain, this single double bond is preferably located between the second and third carbon atoms in the side chain. As used herein, the term "carbon-carbon double bond" means a double bond between two carbon atoms, but excludes the double bonds of an aromatic ring.

The backbone of the oxygen absorbing polymer may have different configurations depending upon the type of monomer block used in the polymerization of the base polymer material for the packaging product. Different monomer blocks may be chosen depending on the intended application, including the desired properties of the final product, the expected use of the polymer composition, the other materials with which the polymer composition will be mixed or come into contact, or the type of polymer desired. Depending upon the precursors chosen, the polymer backbone may be, for example, a polyester, a polyurethane, a polyepoxide, or a polyamide. A polyester backbone is particularly preferred.

In one embodiment, the oxygen absorbing polymer backbone has at least one structural unit represented by formula (I):

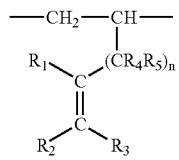

In formula I, $R_1$ denotes one of a hydrogen atom, a substituted or unsubstituted alkyl group, a substituted or unsubstituted cycloalkyl group, or a substituted or unsubstituted alkenyl group. $R_1$ preferably has less than 20 carbon atoms, more preferably less than 10 carbon atoms. Most preferably, $R_1$ is H.

$R_2$ denotes one of a hydrogen atom, a substituted or unsubstituted alkyl group, a substituted or unsubstituted cycloalkyl group, or a substituted or unsubstituted alkenyl group. $R_2$ preferably has less than 20 carbon atoms, more preferably less than 10 carbon atoms. Even more preferably, $R_2$ is a substituted or unsubstituted alkyl group, which may be linear or branched, that has 1 to 10 carbon atoms. Most preferably, $R_2$ is a linear alkyl group with 1 to 10 carbon atoms, and a in a particularly preferred embodiment $R_2$ has 5 carbon atoms.

$R_3$ denotes one of a hydrogen atom, a substituted or unsubstituted alkyl group, a substituted or unsubstituted cycloalkyl group, or a substituted or unsubstituted alkenyl group. $R_3$ preferably has less than 20 carbon atoms, more preferably less than 10 carbon atoms, and most preferably $R_3$ is H.

$R_4$ denotes one of a hydrogen atom, a substituted or unsubstituted alkyl group, a substituted or unsubstituted cycloalkyl group, or a substituted or unsubstituted alkenyl group. $R_4$ preferably has less than 20 carbon atoms, more preferably less than 10 carbon atoms, and most preferably will denote a hydrogen atom.

$R_5$ denotes one of a hydrogen atom, a substituted or unsubstituted alkyl group, a substituted or unsubstituted cycloalkyl group, or a substituted or unsubstituted alkenyl group. $R_5$ preferably has less than 20 carbon atoms, more preferably less than 10 carbon atoms, and most preferably will denote a hydrogen atom.

In formula (I), n preferably denotes an integer from 1 to 10. More preferably, n will be an integer less than 5, and more preferably n=1.

Further, in formula (I), $R_2$ and $R_3$ may be interchanged as a result of stereochemistry about the double bond.

In one particularly preferred embodiment, $R_1$, $R_3$, $R_4$ and $R_5$ denote a hydrogen atom, and $R_2$ is a linear substituted or unsubstituted alkyl group with 1 to 10 carbon atoms, more preferably 5 carbon atoms, and n=1.

Although not intending to be bound by any theory, it is believed that the active oxygen scavenging ability of the oxygen scavenging polymer is based on the one or more carbon-carbon double bonds in the side chain of the polymer, which are exposed and available for oxidation.

Since the double bonds on the side chains in the oxygen scavenging polymer are in large part responsible for its oxygen scavenging properties, the number of unsaturated side chains present in the polymer is an important factor in determining its oxygen scavenging capacity. A sufficient number of side chains should be present for the polymer and/or composition to perform adequately, and for a suitable length of time.

However, while adding more side chains increases the oxygen scavenging ability of the oxygen scavenging polymer, increasing the number of side chains also begins to alter the quality and characteristics of the polymer compared to its unmodified base form. For example, adding too many side chain monomers may cause the resulting oxygen scavenging polymer to have a lower glass transition temperature ($T_g$), melting point, or physical properties compared to an unmodified base polymer without the side chains. For example, in some embodiments it has been found that when the side chain monomers present in the oxygen scavenging polymer approach about 30% by weight, the polymer may start to become more rubbery compared to the unmodified base polymer. In addition, for example, if the side chains are too large, the oxygen scavenging polymer may begin to plasticize and/or agglomerate. In preferred embodiments, the side chains constitute between 1 and 30 weight percent of the oxygen scavenging polymer. More preferably, the side chains constitute between 2 and 25 weight percent of the oxygen scavenging polymer, most preferably between 5 and 24, and optimally the side chains constitute between 10 and 20 weight percent of the oxygen scavenging polymer.

As the properties of the oxygen scavenging polymer can change based on the percentage and size of the side chains present, it is important to monitor the physical properties of the polymer. For example, increasing the amount of branching in the backbone of the oxygen scavenging polymer, or increasing the number and/or the size of side chains present in the oxygen absorbing polymer beyond a certain level may result in changes in viscosity. Many manufacturing processes are optimized and constructed to operate within certain viscosity and temperature ranges, and changing these physical properties can increase processing costs. Thus, the side chains are preferably present in an amount sufficient such that the viscosity remains in the desired target range.

For example, when used with other polymers, such as in a blend, the viscosity of the oxygen absorbing polymer preferably should be similar to that of the other polymer(s) in the blend. Or, if a multi-layer packaging article is to be produced, the size and number of side chains may make the oxygen scavenging polymer increasingly different from the other layers. This can decrease the clarity of the final product, and may cause the layers of the resulting article to separate from one another.

An optional oxidation catalyst is preferably present with the oxygen scavenging polymer to form an oxygen scavenging polymer composition. The oxidation catalyst enhances the oxygen scavenging properties of the oxygen scavenging polymer by catalyzing an oxygen scavenging reaction with the side chains attached to the polymer backbone. While not wishing to be bound by any theory, the oxidation catalyst is believed to assist in activating the double bond(s) of the side chain(s) of the oxygen scavenging polymer to facilitate a reaction with oxygen.

If desired, the oxygen scavenging polymer composition may be dissolved in a suitable solvent to form a coating solution, or may be blended with water and/or a suitable solvent to form a coating dispersion. The coating solution or dispersion may be applied using known methods, e.g. spraying, onto a surface of a packaging article and dried to form an oxygen scavenging coating. The coating dispersion may be applied between layers of another suitable polymer to form an oxygen scavenging film.

Or, the oxygen scavenging polymer composition may be blended with another compatible polymer to form an oxygen scavenging article, or may be used as an oxygen scavenging layer in a multi-layered package construction.

A broad variety of metallic and organic compounds can catalyze the oxygen scavenging effect of the side chains, and an appropriate compound may be selected based on any of cost, compatibility with the oxygen scavenging polymer, compatibility with other polymers in a blend, and compatibility with other layers in a multi-layered package. Suitable oxidation catalysts include transition metals, complexes of transition metals, photoinitiators, and the like.

Examples of suitable catalysts include transition metals such as cobalt, iron, nickel, aluminum, ruthenium, rhodium, palladium, antimony, osmium, iridium, platinum, copper, manganese, and zinc, as well as oxides, salts or complexes of these metals. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include salts of cobalt and long chain acids such as, for example, cobalt acetate, cobalt neodecanoate, cobalt stearate, and cobalt octoate.

Mixed metal nanoparticles may also be suitable as a catalyst. Suitable nanoparticles typically have an average particle size of less than about 200 nm, preferably less than about 100 nm, and more preferably between 5 and 50 nm.

Examples of suitable photoinitiators include, but are not limited to, benzophenone, o-methoxybenzophenone, acetophenone, o-methoxy-acetophenone, acenaphthenequinone, methyl ethyl ketone, valerophenone, hexanophenone, alpha-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, alpha-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, alpha,alpha-diethoxyacetophenone, alpha,alpha-dibutoxyacetophenone, etc. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl) phenyl]propanone]. Blends of photoinitiators may also be used.

Generally, photoinitiators must be activated to function most effectively. Photoinitiators may be activated using various types of radiation. For example, the radiation used can be actinic, e.g. ultraviolet or visible light having a wavelength of about 200 to 750 nanometers (nm), and preferably having a wavelength of about 200 to 400 nm. When employing ultraviolet and/or visible light, it is preferable to expose the composition to at least 0.1 Joules per gram of composition. A typical amount of exposure is in the range of 10 to 100 Joules per gram. Another suitable type of radiation that can be used is an electron beam, having a suitable dosage from about 0.2 to about 20 megarads, preferably from about 1 to about 10 megarads. Other possible types and sources of radiation include ionizing radiation such as gamma, x-rays and corona discharge. The radiation exposure is preferably conducted in the presence of oxygen. The duration of exposure depends on several factors including, but not limited to, the amount and type of photoinitiator present, thickness of the layers to be exposed, amount and type of other components present, and the wavelength and intensity of the radiation source.

The oxidation catalyst should be present in an amount sufficient to catalyze the oxygen scavenging ability of the oxygen scavenging polymer. The amount used will depend partially upon the catalyst chosen. However, in general, when using transition metal catalysts or complexes, the amount of transition metal catalyst or complexes present may suitably be greater than about 10 ppm by weight, preferably greater than about 100 ppm by weight, and more preferably greater than about 300 ppm by weight of the total composition. The amount of transition metal catalyst or complexes present may suitably be less than about 10,000 ppm by weight, preferably less than about 1000 ppm by weight, and more preferably less than about 600 ppm by weight of the total composition. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

In some embodiments, the method of introduction of the oxidation catalyst may impact the resultant composition's performance or properties. For example, in some cases the introduction of an oxidation catalyst to the composition may cause undesirable side-reactions within the composition that can lessen the composition's molecular weight, or cause discoloration of the composition. Other factors which may influence the composition's propensity to degrade include: the presence of appreciable amounts of water during melt processing of the polymer; the presence of foreign reactive functionalities (such as hydroxyl, amino, thiol, carboxylic acid, etc.) during melt processing of the polymer; the presence of appreciable amounts of molecular oxygen during melt processing of the polymer; and/or the presence of appreciable amounts of strongly acidic (e.g., HCl, $H_2SO_4$), or strongly basic (e.g., KOH, etc.) materials during melt processing of the polymer. Care should be taken to avoid such undesirable results, for example, by lessening the concentration of the aforementioned water, foreign reactive functionalities, molecular oxygen, or acidic or basic materials during melt processing of the polymer.

One consideration in this regard involves the choice of oxidation catalyst. It has been discovered that certain oxidation catalysts are less prone to catalyzing the aforementioned undesirable side-reactions. As a result, one can, in some situations, select a suitable oxidation catalyst (i.e., a catalyst that provides the desired level of oxygen scavenging) that does not cause an undesirable amount of degradation of the composition. For example, cobalt oxide can generally be introduced to the composition with little observable degradation.

Another consideration is the conditions under which the oxidation catalyst is added to the composition. For example, it has been observed that prolonged exposure at high temperature of certain compositions containing the oxidation catalyst will result in an increased amount of degradation. As a result, it has been discovered that processes that avoid prolonged, high temperature exposure of the oxidation catalyst within the composition can be beneficial. This can be done, for example, by lessening exposure of the molten polymer to excessive levels of shear during mixing and/or transporting. Alternatively, the oxidation catalyst can be added to preformed polymer using mild melt mixing techniques such as a Buss kneader. Alternatively, the composition may be prepared in a batch reactor and the catalyst added quantitatively in a manner that minimizes the residence time of the molten polymer/catalyst blend prior to ejection, and cooling. In an extruder reactor the catalyst may be added near the ejection port to minimize residence time of molten polymer with catalyst.

In the event some molecular weight degradation does occur, then it is within the scope of this invention to subject the degraded composition to a solid-stating process to rebuild the molecular weight. For more seriously degraded materials, the composition might need to be purified to remove or lessen the amount of undesirable discolored material.

Another aspect of the present invention is an article including an oxygen scavenging polymer or oxygen scavenging polymer composition. Articles, including but not limited to, bottles, cups, bowls, containers, films, wraps, liners, coatings, trays, cartons, and bags for industrial, commercial, or residential use may be formed and produced. The articles may be formed by using the oxygen scavenging polymer and/or composition alone, by using a blend of the oxygen scavenging polymer and/or composition with one or more other polymers, or by using a multi-layer construction incorporating one or more layers including the oxygen scavenging polymer and/or composition. Additionally, the oxygen scavenging polymer and/or composition may be used as a coating, as a lining, or as part of a blend for a coating or lining of another article, such as a can, bottle, or container coating or lining.

A single layer article is an article formed of substantially the same composition throughout. For example, the article may be produced using only the oxygen scavenging polymer and/or composition, or it may be produced using a blend of the polymer and/or composition with one or more other polymers. For example, a single layer bottle would typically be produced using a blend of up to about 10% of the oxygen scavenging polymer composition and 90% of another polymer suitable for packaging applications, such as PET, PEN, and the like.

Compatible polymers should be selected if a blend is prepared. Preferably, a polymer will be selected that has similar viscosity and similar characteristics to the oxygen scavenging polymer and/or composition. If a blend is used, the blend may be formed at any point, but preferably will be formed during the article production process. The oxygen scavenging polymer and/or composition and a compatible polymer may be fed separately into the article production process, and then blended during the process before being formed into the desired article. For example, the separate polymers may be fed into an injection molder, and the components will melt and blend in the screw of the injection molder. Then, the combination will jointly be formed into the produced article. The single layer article will scavenge oxygen passing through the material, oxygen within the container during filling or storage, as well as oxygen at the outside surface.

For example, a polyester based polymer composition may be blended with another polymer, having similar viscosities and other properties to enable a high degree of mixing and increase the consistency of the final article. Examples of suitable polyester resins include, but are not limited to, polyethylene terephthalate (PET), polybutylene terephthalate (PBT), polyethylene naphthalate (PEN), and polybutylene naphthalate (PBN). The appropriate polymer will be selected to provide the desired final article properties. Additionally, factors such as blend compatibility, resulting physical characteristics of the blend, and amount of the oxygen scavenging polymer composition included in the blend will be considered.

A multi-layer product may be produced that includes the oxygen scavenging polymer and/or composition. A multi-layer product benefits from placing a layer of another material between the atmosphere and the oxygen scavenging polymer and/or composition. The outer layer will usually protect the oxygen scavenging polymer and/or composition from physical damage, and also assists in blocking some atmosphere and oxygen out. The oxygen scavenging polymer and/or composition will therefore primarily scavenge oxygen that penetrates the outer layer, or is present inside the container during filling or storage. Therefore, an additional outside layer may be beneficial in extending the effectiveness of the article, while maintaining other desirable properties. An additional outside layer may also enable the same effective oxygen protection while using less of the oxygen scavenging polymer and/or composition. A particularly preferred multi-layer product is a five layer bottle in which the outer, central, and inner layers were formed using PET. The outer-central and the inner-central layers were formed using the oxygen scavenging polymer.

The compatibility of the materials used is an important consideration for a multi-layer article. If the materials are not compatible, the layers may separate or the material may appear cloudy or hazy. Layer separation could lead to failure of the article, decrease clarity even further, degrade the strength or resilience of the article, change the functionality, and might lead to premature exhaustion of the oxygen scavenging polymer composition. Appropriate adhesives or other materials may be required for use between layers to maintain article integrity, which may lead to increased costs, manufacturing challenges, and may impact recycling. Therefore, the layers will preferably be compatible if a multi-layer article is produced. For example, polymers having similar physical properties such as a viscosity and Tg may be used in conjunction with the oxygen scavenging polymer and/or composition.

An oxygen scavenging polymer may be formed using a wide range of processes, including, for example, reactor polymerization and reactive extrusion.

Reactor polymerization includes batch and continuous processing. Various components may be charged into a reactor, and the reaction conditions set. After suitable reaction time, the composition may be removed.

In reactive extrusion, the components may be fed into the mixing zone of the extruder. The components may be mixed together before feeding in to the extruder, or may be fed separately. Preferably, the components will be fed separately. As part of the extrusion process, the components will be subjected to elevated temperature, pressure, and shear as the components travel through the extruder. This process mixes the components, and also causes the components to react, forming the polymer composition.

For example, a preferred method of forming the oxygen scavenging polymer is to react one or more polymer precursors (monomers), a succinic anhydride derivative, and a polymerization catalyst. The polymer precursors will be monomers that will polymerize with other monomers and the succinic anhydride derivative to form the desired polymer composition.

For example, a polyester may be formed using a glycol and a succinic anhydride derivative. Other polyesters may be formed using a polymer precursors selected from a number of dicarboxylic acid components. Suitable examples of dicarboxylic acid components include, but are not limited to, terephthalic acid, isophthalic acid, naphthalic acid, 2,6-naphthalene dicarboxylic acid, other naphthalene dicarboxylic acid isomers, mixtures of dicarboxylic acid components, and derivatives thereof. The dicarboxylic acid components may be present as derivatives, such as, for example, bis-hydroxyethyl terephthalate. Similarly, other suitable components may be selected and used in forming other types of polymers such as polyamide, polyepoxy, and polyurethane polymers.

Alternatively, the components used may include one or more polymers, a succinic anhydride derivative, and a polymerization catalyst. The polymer will react with the succinic anhydride derivative to form the desired polymer composition. This is the preferred method when using reactive extrusion, but may also be accomplished using a reactor. Suitable polymers for use in this process include polyesters such as PET, PBT, PEN, and PBN. Similarly, other suitable polymers will be used when forming a polyepoxy, polyamide, or polyurethane. Additionally, new or recycled resins may be used.

Examples of suitable succinic anhydride derivatives include a reaction product of maleic anhydride and a substituted alkene. Suitable substitutents for the alkene include saturated or unsaturated hydrocarbon chains that may be linear or branched, and substituted or unsubstituted, as well as substituted or unsubstituted phenyl groups. Some of the substituents on the alkenyl group may be bound together as part of a ring structure. Preferred succinic anhydride derivatives include octenyl succinic anhydride (OSA), nonenyl succinic anhydride (NSA), heptenyl succinic anhydride (HSA), and the like. Octenyl succinic anhydride (OSA), shown in Formula (II), is particularly preferred.

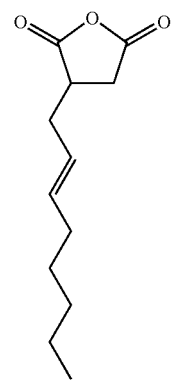

The benefits of using a succinic anhydride derivative include: ease of processing; general availability at low cost; ability to co-polymerize; compatibility with many polymers and monomers for reaction; stability during storage; and low toxicity.

The succinic anhydride may be reacted with a wide variety of materials, depending upon the type of polymer backbone desired. For example, reactants may be selected to form a succinic anhydride derivative, which may then react to form the desired side chain monomer. For example, if a succinic anhydride derivative is reacted with an alcohol or glycol, the resulting compound can be used to form a polyester. As another example, a succinic anhydride derivative may be reacted with an amine, and then used in a polymerization, forming a polyamide.

When using a reactor, a succinic anhydride derivative may be formed prior to addition to the reactor, or may be formed from a succinic anhydride and another component in the reactor. When using reactive extrusion, a succinic anhydride derivative will preferably be used.

The materials used may also add other, additional features to the resulting polymer. For example, a trifunctional polyol could be used to form the succinic anhydride derivative, which would lead to additional branching in the resulting polymer.

A polymerization catalyst is preferably used to promote the polymerization reaction. Suitable polymerization catalysts include transition metal catalysts such as manganese, iron, antimony, or titanium. The transition metal catalyst should be added in an amount sufficient to catalyze the polyester reaction. The amount of polymerization catalyst present may suitably be greater than about 10 ppm by weight, preferably greater than about 100 ppm by weight, and more preferably greater than about 200 ppm by weight, based on the total weight of the reaction mixture. The amount of polymerization catalyst present may suitably be less than about 1000 ppm by weight, preferably less than about 800 ppm by weight, and more preferably less than about 500 ppm by weight.

In addition, a compound, such as, for example, phosphoric acid may be used to deactivate any transesterification catalyst (e.g., manganese transesterification catalyst) that may be present.

A wide variety of additional components may be present in the polymer composition of the present invention without detracting from its oxygen scavenging properties, and this is particularly important when recycled resins, such as recycled polyesters, are used.

Depending on the intended end use of the packaging material, optional additives may be incorporated into the oxygen scavenging polymer composition. Suitable additives include heat stabilizers, antioxidants, colorants, crystallization agents, blowing agents, fillers, accelerants, and the like. Preferably, an anti-oxidant, such as BHT, will be added, as the anti-oxidant enhances the stability of the oxygen scavenging composition during processing.

Whether the oxygen scavenging polymer is formed using reactor polymerization, reactive extrusion, or other method, an oxidation catalyst can be added at different times, forming the oxygen scavenging polymer composition. Suitable locations for addition of an oxidation catalyst include: adding the catalyst into the reactor during polymerization, adding the catalyst into an extruder during reactive extrusion, adding the catalyst as the polymer is formed into pellets, or adding the catalyst together with the polymer composition during the article production process. For example, pellets of the oxygen scavenging polymer may be blended with pellets of another polymer having the oxidation catalyst therein. The blend of these pellets may then be combined (e.g., melted and mixed), during or immediately preceding article fabrication.

In addition, whether the oxygen scavenging polymer is formed using reactor polymerization, reactive extrusion, or other method, the resulting polymer composition can be used in forming articles, may be stored, or may be sent for further processing. Possible further processing steps include pelletization and solid stating.

After the oxygen scavenging polymer is formed, it may be processed for ease in handling, storage, and later use. One method to accomplish this is pelletization, in which a polymer composition is chopped or ground into small pieces or flakes. Other components may also be added during this process.

As a polymer composition forms, it also increases in molecular weight. The reaction process also leads to increasing viscosity of the material. As a polymer composition becomes more viscous, it also becomes more difficult to process. Therefore, solid stating is often used in polymer formation. Solid stating refers to a process in which a polymer is formed, and when the polymerization reaches a certain point (or a certain viscosity is reached) the polymerization is temporarily stopped. At this point, polymer pellets are formed, as the polymer is still able to be handled and processed relatively easily. The polymer pellets are then fed into a rotary vacuum dryer (available from Stokes Vacuum Inc.). The rotary vacuum dryer incorporates temperature control for heating, and has a tumbler to keep the pellets loose and free flowing. The pellets are introduced, tumbling is begun, and heat is introduced. This causes the polymerization reaction to continue within the pellets. This continued reaction forms higher molecular weight polymers, which are more useful than polymers of lower molecular weight in many applications. Because the polymerization continues and molecular weight increases within the pellets, handling and processing remains the same. Solid stating may be used in conjunction with any of the methods used for forming the polymer composition.

For example, when creating a polyester, it may be desirable to select components to provide a composition with a melt viscosity as close as possible to about 0.8 intrinsic viscosity. This provides excellent compatibility with bottle grade PET, which has an intrinsic viscosity of about 0.80 to about 0.85. Thus, a polyester may be formed by: (1) reacting until a certain viscosity is reached; and then optionally performing the following techniques, either alone or in combination: (2) solid stating; and/or (3) introducing branching into the polymer using materials such as, for example, pyromellitic dianhydride (PMDA) to increase melt viscosity (See, for example, U.S. Pat. No. 6,863,988). This would form an oxygen scavenging polymer composition having the desired viscosity and the desired molecular weight.

Appropriate care must be used when handling and storing the oxygen scavenging polymer, particularly after the oxidation catalyst has been added to form the oxygen scavenging composition. Specifically, exposure to oxygen should be minimized until use. Therefore, production and storage of the composition under conditions eliminating or minimizing oxygen are preferred. For example, the composition may be stored in well-sealed containers, or under an inert atmosphere such as nitrogen, until use.

Tests of an oxygen scavenging polymer composition may be conducted by various methods. Oxygen content of a gas sample may be analyzed by the Ocean Optics Foxy Oxygen Sensor System (available from Ocean Optics, Dunedin, Fla.). This system uses fluorescence and quenching to measure oxygen content.

In order to test the viscosity of the oxygen scavenging polymer, various viscosity tests may be employed. One testing scheme, solution viscosity, is carried out via dissolving an amount of the oxygen scavenging polymer composition in an appropriate solvent. Another testing scheme is melt viscosity, using a Dynisco or other capillary rheometer may be used. This test is conducted following ASTM D3835-96 "Standard Test Method for Determination of Properties of Polymeric Materials by Means of a Capillary Rheometer." This test is conducted by testing the viscosity of the composition in a liquid form. Preferably, a melt viscosity test will be used, as the viscosity that is important is the viscosity of the material during manufacturing, or the viscosity in the molten state.

EXAMPLES

Example 1

An oxygen scavenging polymer was produced using the following procedure:

A vacuum vessel equipped with high torque agitation, temperature control, vacuum, and a Nitrogen purge was prepared. The prepared vessel is capable of achieving a vacuum of less than 1 torr, and is able to reach a temperature of 285° C. or higher.

The set point on the reactor heating is set to 285° C. When the reactor temperature reaches 185° C., sufficient Nitrogen is purged through the system to eliminate Oxygen. After purging, 2242 grams of Bis-Hydroxethyl Terephthalate (BHT), a fine flowing powder, 558 grams of Bis-Hydroxyethyl Octenylsuccinate, a viscous liquid, 0.57 grams of Titanium catalyst (Tyzor TOT), and 0.14 grams of $Sb_2O_3$ are charged into the reactor with agitation. The system is closed, agitation continues, and vacuum is slowly applied. During polymerization, ethylene glycol is given off by the reaction of the components, and is removed by boiling off under vacuum. When the desired agitator torque has been achieved, the reactor is vented with Nitrogen to atmospheric pressure and the material is discharged.

Example 2

The same reaction conditions as described in Example A were established. Then, the following components charged to the reactor: 27.230 kg of dimethylterephthalate (DMT); 5.895 kg of octenyl succinic anhydride (OSA); 20.880 kg of ethylene glycol, 16.7 grams of manganese(II) acetate tetrahydrate; 7.1 grams of phosphoric acid; and 24.5 grams of antimony (III) oxide.

The same reaction conditions were followed, except that, in this case, water and methanol were given off during the esterification step of the reaction. Thus, the water and methanol by-products were removed under vacuum. Additionally, there was a small amount of glycols that were also removed by vacuum.

Example 3

Another oxygen scavenging polymer was produced using the following procedure:

A flask equipped with agitation, temperature control, reflux condensor with provisions for collecting distillate, and a Nitrogen purge was prepared. The flask was charged with 1556.7 g of Octenylsuccinic Anhydride and 942.0 grams of Ethylene Glycol. A Nitrogen flow was also established. Under continuous agitation, the contents of the flask were heated to a setpoint of 170° C. After the onset of water distillation, 1.25 grams of Fascat 4201 catalyst was charged into the flask, and the temperature setpoint was raised to 200° C. After 91.4 grams distillate were collected, the temperature setpoint was raised to 210° C. After 118.9 grams distillate were collected, the setpoint was raised to 220° C. The reaction was ended when the product reached an Acid Number of 0.6.

Example 4

Yet another oxygen scavenging polymer was produced using the following procedure:

A flask equipped with agitation, temperature control, reflux condensor with provisions for collecting distillate, and a Nitrogen purge was prepared. The flask was charged with 345.0 g of C16-C18 Alkenyl Succinic Anhydride, 62.0 grams of Ethylene Glycol, and 0.34 g of Dibutyltin Oxide. A Nitrogen flow was also established. Under continuous agitation, the contents of the flask were heated to a setpoint of 200° C. The reaction was ended when the product reached an Acid Number of 24.

Example 5

Another oxygen scavenging polymer was produced using the following procedure:

A flask equipped with agitation, temperature control, reflux condensor with provisions for collecting distillate, and a Nitrogen purge was prepared. The flask was charged with 304.0 g of Tetrahydrophthalic Anhydride, 124.0 grams of Ethylene Glycol, and 0.40 g of Dibutyltin Oxide. A Nitrogen flow was also established. Under continuous agitation, the contents of the flask were heated to a setpoint of 230° C. The reaction was ended when the product reached an Acid Number of 5.6.

Example 6

A sample prepared according to Example 3 was mixed with 5% w/w of a Cobalt catalyst (OMG 12% Cobalt Hex-Cem) to form an oxygen scavenging composition. Two test samples were prepared by coating 30-35 mg of this mixture onto a glass plate.

A sample prepared according to Example 4 was mixed with 5% w/w of a Cobalt catalyst (OMG 12% Cobalt Hex-Cem). Two test samples were prepared by coating 120 mg of this mixture onto a glass plate.

A sample prepared according to Example 5 was mixed with 5% w/w of a cobalt catalyst (OMG 12% Cobalt Hex-Cem). Two test samples were prepared by coating 30-35 mg of this mixture onto a glass plate.

Two samples of steel wool were prepared by wetting the steel wool. In addition, samples of a PET monolayer bottle were prepared for use as a control.

All test samples were individually sealed inside 15.24 cm×7.62 cm (6"×3") heat sealable foil pouches. The bags were heat sealed under 1 atmosphere of pressure, which has an oxygen content of 20.948%. Samples were stored at ambient temperature and at 49° C. (120° F.) in a hot room. After one week, air samples were taken from the sealed pouches and analyzed using an Ocean Optics Foxy Oxygen Sensor System. The results were measured after two minutes of exposure to the sensor. The oxygen scavenging effectiveness of the material was calculated by subtracting the oxygen content measured after 1 week from the initial oxygen content and dividing by the weight of the sample material used. The results are reported in Table 1.

TABLE 1

| Sample | % Oxygen Scavenged/mg Scavenger (Room Temperature) | % Oxygen Scavenged/mg Scavenger (49° C. (120° F.)) |
|---|---|---|
| Control #1 | 0.00 | 0.00 |
| Control #2 | 0.00 | 0.00 |
| Wet Steel Wool #1 | 0.07 | 0.07 |
| Wet Steel Wool #2 | 0.07 | 0.07 |
| Example 3 #1 | 2.07 | 3.18 |
| Example 3 #2 | 2.61 | 3.03 |
| Example 4 #1 | 1.47 | 2.34 |
| Example 4 #2 | 0.45 | 2.88 |
| Example 5 #1 | 0.06 | 0.18 |
| Example 5 #2 | 0.06 | 0.18 |

Example 7

A sample prepared according to Example 1 was fed into a Brabender extruder in conjunction with polyethylene terephthalate. A cobalt catalyst (OMG 12% Cobalt Hex-Cem) was also fed into the extruder at the same time to provide the resulting compositions with 5% w/w Cobalt catalyst. The feed conditions were modified to create two compositions, one composition having 10% w/w of the material from Example 1, and one composition having 20% w/w of the material from Example 1. Films were extruded having thickness of 12 microns and 24 microns for both compositions. Each film were sealed inside 15.24 cm×7.62 cm (6"×3") heat sealable foil pouches. The bags were heat sealed under 1 atm of pressure, which has an oxygen content of 20.948%. After one week of storage at ambient temperature, air samples were taken from the sealed pouches and analyzed using an Ocean Optics Foxy Oxygen Sensor System. The % oxygen consumption was calculated for each sample, and the results are reported on Table 2.

TABLE 2

| % Material from Example 1 | Film Thickness (μ) | % Oxygen Consumption |
|---|---|---|
| 10% | 12 | 97.8 ± 0.7 |
| 10% | 24 | 96 ± 1.2 |
| 20% | 12 | 27.3 ± 8.2** |
| 20% | 24 | 80 ± 8.5 |

**= anomalous result likely caused by dense packing of film in pouch, resulting in less exposed surface area

Example 8

Articles

A three layer bottle was produced, including outer and inner layers of PET, and a central layer is formed using the oxygen scavenging polymers of examples 1 and 2 with a cobalt catalyst complex. The three layers had a high degree of compatibility, and tightly molded together during the production of the bottle.

A three layer film was produced in which the top and bottom layer are formed using PET, and the central layer was formed using the oxygen scavenging polymers of examples 1 and 2 with a cobalt catalyst complex.

A coating solution was formed by mixing 50% solvent and 50% of the polymer composition of Example 3. A can coating was formed by spraying the coating dispersion on an inside surface of a metal can.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising:
   an oxygen-scavenging polymer that includes a condensation backbone having at least one structural unit represented by formula (I):

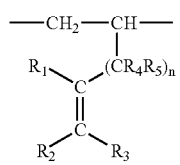

(I)

wherein $R_1$, $R_2$, $R_3$, $R_4$, and $R_5$ independently denote one of a hydrogen atom, a substituted or unsubstituted alkyl group, a substituted or unsubstituted cycloalkyl group, or a substituted or unsubstituted alkenyl group, and n denotes an integer from 1 to 10; and
   at least about 10 parts per million (ppm) by weight of an oxidation catalyst.

2. The composition of claim 1, wherein $R_1$ denotes hydrogen.

3. The composition of claim 1, wherein $R_1$, $R_2$, $R_3$, $R_4$, and $R_5$ each have less than 20 carbon atoms.

4. The composition of claim 1, wherein $R_4$ and $R_5$ denote hydrogen.

5. The composition of claim 1, wherein $R_1$, $R_2$, and $R_3$ each comprise less than 10 carbon atoms.

6. The composition of claim 1, wherein n is an integer less than 5.

7. The composition of claim 1, wherein $R_1$, $R_3$, $R_4$, and $R_5$ each denote hydrogen, wherein n=1, and wherein $R_2$ denotes a linear substituted or unsubstituted alkyl group with 1 to 10 carbon atoms.

8. The composition of claim 7, wherein $R_2$ denotes a linear alkyl group with 5 carbon atoms.

9. The composition of claim 1, wherein the backbone is a polyester.

10. The composition of claim 1, wherein between 1 and 30 weight percent of the polymer comprises monomers including the structural unit.

11. The composition of claim 1, wherein between 2 and 25 weight percent of the polymer comprises monomers including the structural unit.

12. The composition of claim 1, wherein between 10 and 20 weight percent of the polymer comprises monomers including the structural unit.

13. The composition of claim 1, wherein the catalyst is present at a concentration from about 10 ppm to about 1000 ppm by weight.

14. The composition of claim 1, wherein the catalyst is present at a concentration from about 300 ppm to about 600 ppm by weight.

15. The composition of claim 1, wherein the catalyst comprises one or more transition metal complexes.

16. The composition of claim 1, wherein the catalyst comprises the reaction product of cobalt and a long chain acid.

17. The composition of claim 1, wherein the catalyst is selected from the group consisting of cobalt neodecanoate, cobalt stearate, and cobalt octoate.

18. The composition of claim 1, wherein the catalyst comprises a uv-activated catalyst.

19. The composition of claim 1, further comprising a filler, colorant, antioxidant, heat stabilizer, crystallization agent, blowing agent, or accelerant.

20. A solution comprising the composition of claim 1 and a solvent.

21. An article comprising the composition of claim 1.

22. An article comprising a layer of the composition of claim 1.

23. The article of claim 22, further comprising a second layer of a second polymer.

24. The article of claim 23, wherein the second polymer is polyethylene terephthalate.

25. The composition of claim 1, wherein the condensation backbone comprises a polyurethane.

26. The composition of claim 1, wherein the condensation backbone comprises a polyepoxide.

27. The composition of claim 1, wherein the condensation backbone comprises a polyamide.

28. The article of claim 22, wherein the article comprises a packaging article.

29. The article of claim 28, wherein the article comprises a bottle.

30. A packaging article, comprising:
   a layer of an oxygen-scavenging composition including:
      an oxygen-scavenging polymer comprising a condensation backbone having at least one pendant group represented by formula (I) attached to a carbon atom of the backbone:

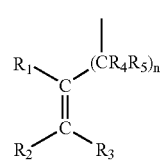

(I)

wherein, $R_1$, $R_2$, $R_3$, $R_4$, and $R_5$ independently denote one of a hydrogen atom, a substituted or unsubstituted alkyl group, a substituted or unsubstituted cycloalkyl group, or a substituted or unsubstituted alkenyl group, and n denotes an integer from 1 to 10; and
   at least about 10 parts per million (ppm) by weight of an oxidation catalyst.

* * * * *